United States Patent [19]
Förster

[11] Patent Number: 6,082,507
[45] Date of Patent: Jul. 4, 2000

[54] ROTARY VIBRATION DAMPER

[75] Inventor: Andreas Förster, Schweinfurt, Germany

[73] Assignee: Mannesmann Sachs AG, Schweinfurt, Germany

[21] Appl. No.: 09/005,117

[22] Filed: Jan. 9, 1998

[30] Foreign Application Priority Data

Jan. 9, 1997 [DE] Germany .............................. 197 00 422

[51] Int. Cl.[7] ........................................................ F16F 9/14
[52] U.S. Cl. ............................................ 188/296; 188/308
[58] Field of Search .................................... 188/296, 290, 188/293, 295, 306, 307, 308, 309; 16/52, 58

[56] References Cited

U.S. PATENT DOCUMENTS 4,274,516  6/1981  Barley ...................................... 188/310

FOREIGN PATENT DOCUMENTS

| 616 146 | 9/1994 | European Pat. Off. . |
| 42 39 160 | 5/1954 | Germany . |
| 27 01 205 | 7/1977 | Germany . |
| 34 29 373 | 4/1985 | Germany . |
| 39 37 454 | 5/1991 | Germany . |
| 41 09 471 | 9/1992 | Germany . |
| 1545977 | 5/1979 | United Kingdom ................. 188/322.5 |

*Primary Examiner*—Matthew C. Graham
*Attorney, Agent, or Firm*—Cohen, Pontani, Lieberman & Pavane

[57] ABSTRACT

A rotary vibration damper having a housing, a stator having stator vanes and a rotor having vanes. The stator and the rotor are arranged in the housing so as to form at least two work chambers fillable with damping medium, which work chambers alternately change their volumes during the vibrational movement. At least one damping device is connected to at least one of the work chambers. At least one radial flow connection is arranged to connect the work chamber to the damping device. The at least one radial flow connection is arranged outside of the rotor vane and the stator vane.

8 Claims, 8 Drawing Sheets

ROTARY VIBRATION DAMPER

BACKGROUND OF THE INVENTION

1. Field of the Invention

The invention relates to a rotary vibration damper.

2. Discussion of the Prior Art

A rotary vibration damper is known, for example, from German Reference DE 34 29 373, and includes a rotor and a stator equipped with vanes, which form the work chambers of the rotary vibration damper. During a spring movement of a wheel, the rotor and the stator rotate relative to each other, so that, in alternating fashion, one work chamber is enlarged in its volume and another is reduced.

Choke valves are arranged in the vanes and permit the pressurized damping medium to overflow from the work chamber that is becoming smaller into the enlarging work chamber. To avoid hydraulic blocking, the rotary vibration damper must therefore have at least half as many choke valves as rotor vanes or stator vanes. Moreover, although the number of valves is a problem, what is far more important is that all of the choke valves used must have as identical as possible a damping characteristic, because different pressure levels in the work chambers necessarily result in transverse forces between the rotor and the stator. Such forces can only be controlled by means of an expensive bearing.

SUMMARY OF THE INVENTION

Accordingly, it is an object of the present invention to provide a rotary vibration damper in which the damping forces produce no significant transverse forces.

Pursuant to this object, and others which will become apparent hereafter, one aspect of the present invention resides in a rotary vibration damper having a housing, a stator having stator vanes, and a rotor having vanes. The stator and the rotor are arranged in the housing so as to form at least two work chambers fillable with damping medium. The working chambers alternately change their volumes during vibrational movement of the rotor relative to the stator. At least one damping device is connected to at least one of the work chambers. At least one radial flow connection connects the work chamber to the damping device. The at least one radial flow connection is arranged outside of the rotor vanes and the stator vanes.

The decisive advantage of the invention is that the number of damping devices to be used can be drastically reduced, because the invention provides independence from the number of vanes.

In an especially advantageous space-saving embodiment of the invention, the damping device is arranged centrally relative to the rotational axis of the rotary vibration damper.

In another embodiment, the damping device has a collection space that is connected via radial flow connections to each work chamber. The total possible damping force can thus be achieved with a single damping device, and slight fluctuations in the damping force of the damping device cannot interfere with other damping devices. Furthermore, the interior arrangement of the collection space permits specially protected lines to be dispensed with.

Advantageously, the collection space has two parts, and each of the two parts connects all of the work chambers of one rotational direction. This allows a damping device to be used that has a damping characteristic dependent on flow direction.

To achieve a compact and structurally simple design, the two individual collection spaces are separated by a separating wall, in which the actual damping device is arranged. The damping device has choke openings which are partially covered by valve plates.

It is also possible for the damping device, or a damping valve provided in combination, to have an adjustable damping force. Adjustability preferably refers here to an electrical adjustment of one of the valves during operation. Of course, a pneumatic or hydraulic control could also be used.

Another possibility for influencing the maximum damping force is a bypass slot arranged between two work chambers of different indexing. This bypass slot allows the damping force to flow dependent on torsional angle and thus on stroke. To avoid transverse forces resulting from different pressure levels in the work chambers, the number and the position of the bypass slots are selected so as to permit a symmetrical arrangement relative to the work chambers.

In a further embodiment of the invention, the rotary vibration damper has a compensation space for the expansion in volume that occurs during heating. The compensation space is arranged centrally relative to the rotational axis of the rotary vibration damper. The hub of the rotary vibration damper is thus optimally used.

The compensation space can be arranged in series relative to the collection space. A simple axially-movable separating piston separates the compensation space from the collection space.

According to another embodiment, the damping force setting of the damping device is greater for one of the rotational movements than for the other, under otherwise comparable conditions. As a result, the individual collection spaces have different pressure levels. The compensation space is pressurized from the collection space part that has the lower pressure level. The pressure precompression in the compensation space can thus be kept desirably low. As a result, it is possible for part of the housing to be made of plastic, while, on the other hand, at least one housing part that is in contact with the damping medium is made of a heat-conducting material.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1A:
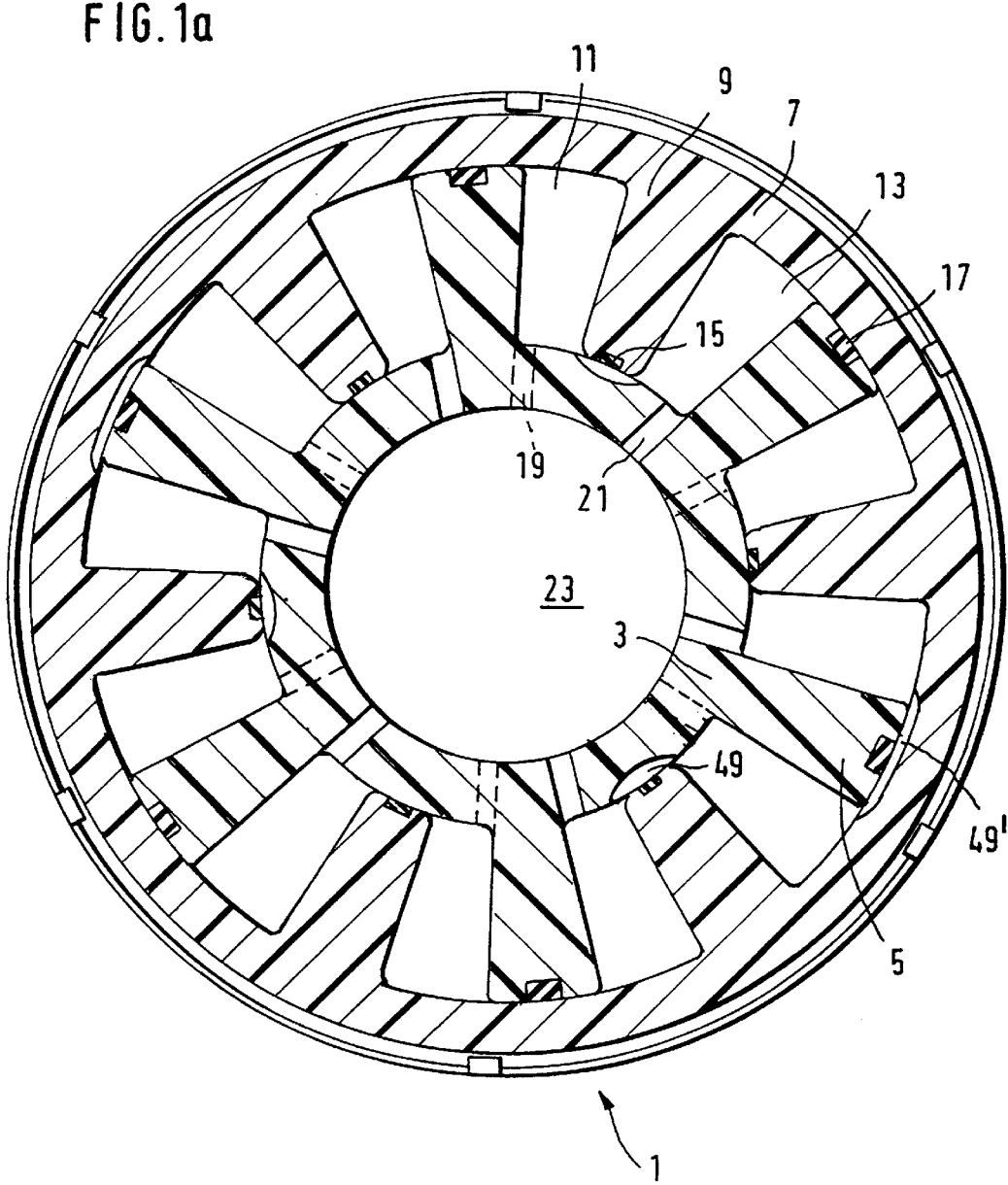
FIG. 1a is a cross-section of a rotary vibration damper pursuant to the present invention.

FIG. 1a shows, in section, a rotary vibration damper 1, which comprises a rotor 3 with rotor vanes 5 and a stator 7 with stator vanes 9. The rotor 3 and the stator 7, with their vanes 5, 9, form work chambers 11, 13. The work chambers 11, 13 are filled with a damping medium and change their volumes in the opposite sense during relative rotational movements. The work chambers 11, 13 are separated respectively by seals 15, 17 in the vanes 5, 9. The rotor-stator attachment can be reversed, depending on the installation situation.

During a spring movement of a wheel (not shown) of a motor vehicle, the rotor 3 is rotated relative to the stator 7. As a result, an overpressure is built up in one of the work chambers of the same indexing, allowing the damping medium to flow from or to a central collection space 23 through at least one radial flow connection 19, 21 per work chamber, which flow connection is provided outside the vanes 5, 9. By "outside" it is meant that the flow connection is not the vane itself. A further description will be given referring to FIG. 1b.

Figure 1B:
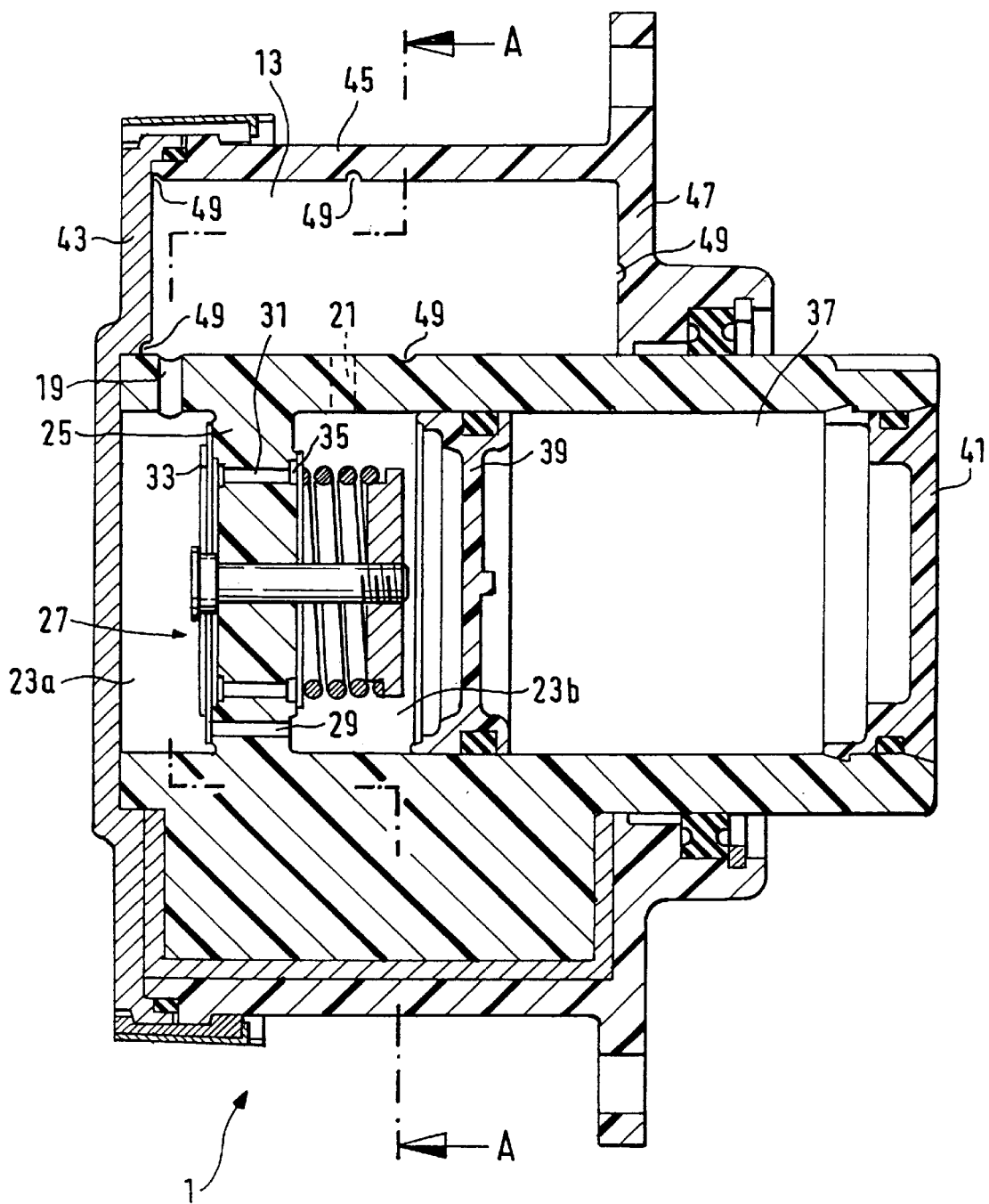
FIG. 1b is a longitudinal section of the rotary vibration damper.

As the longitudinal section in FIG. 1b shows, the collection space 23 is divided by a separating wall 25 into two individual collection spaces 23a, 23b. The individual collection space 23b is provided for the work chamber 11, for example, while the individual collection space 23a is provided for the work chamber 13. A damping device 27 is arranged inside the separating wall 25. The damping device 27 has choke openings 29, 31, which are covered at least partially in the outflow direction by spring-loaded valve plates 33, 35.

The damping device 27 corresponds in its embodiment, in principle, to a piston of a single-tube vibration damper of conventional design. To achieve a simple-to-manufacture rotor, it is even possible to insert a single-tube vibration damper piston into the collection space 23. As in telescopic vibration dampers, the damping effect of the damping device 27 can be made dependent on flow direction by means of various springs or valve plate configurations.

A pressure-precompressed compensation space 37, e.g., with gas padding, is arranged in the central opening of the rotor following the collection space 23. A separating piston 39 separates the individual collection space 23b from the compensation space 37. To keep the pressure precompression low, the compensation space 37 is located next to the collection space 23 in which, given the design of the damping device, the lower pressure level can be expected. An end-side plug 41 seals the compensation space 37.

As FIG. 1b shows, the housing of the stator comprises two parts, i.e., a first lid 43 and a cylinder 45 with a second lid 47. One of these two parts should be made of a heat-conducting material, so that the damping medium heated during choking can be cooled by the slip stream.

The function of the rotary vibration damper 1 is extremely simple. It is assumed that the rotor 3 is rotated counterclockwise relative to the stator 7 in the compression direction of the wheel. The damping medium enclosed in the work chambers 11 is precompressed by the rotor vanes 5, but can flow off through the radial flow connections 19 into the central collection space 23b.

In the collection space 23, the damping device 27 with its choke openings 29 causes a resistance force against the particular ongoing relative movement between the stator 7 and the rotor 3.

Immediately after passing through the choke openings 29, the damping medium enters the first individual collection space 23a. The radial flow connections 21 allow the damping medium to flow off into the work chamber 13, which continuously enlarges in the pressure direction.

In the tension direction, i.e., when the rotor 3 moves in a clockwise direction relative to the stator 7, the damping medium is forced from all work chambers 13 through the radial flow connections 21 into the first individual collection space 23a, where the medium continues to flow through the choke openings 31 into the second individual collection space 23b. From there, the medium flows through the radial flow connections 19 into the work chamber 11.

Constant circulatory pumping of the damping medium is carried out. The compensation space must compensate only for temperature-related volume changes. As a result, the axial movement path of the separating piston is very small.

A rotary vibration damper also makes it possible to attain load-dependent damping forces. For this purpose, a bypass slot 49 or, alternatively, a bypass slot 49', is created in a wall of the work chamber covered by a vane 5, 9, so as to permit a hydraulic short circuit between a work chamber 11 and a work chamber 13. The portion of the damping volume forced through the damping device 27 is thereby reduced. Possible arrangements for the bypass slot are shown in FIGS. 1a and 1b. The number and position of bypass groves between two work chambers permits a symmetrical arrangement, to avoid transverse forces between the rotor and the stator.

Figure 2:
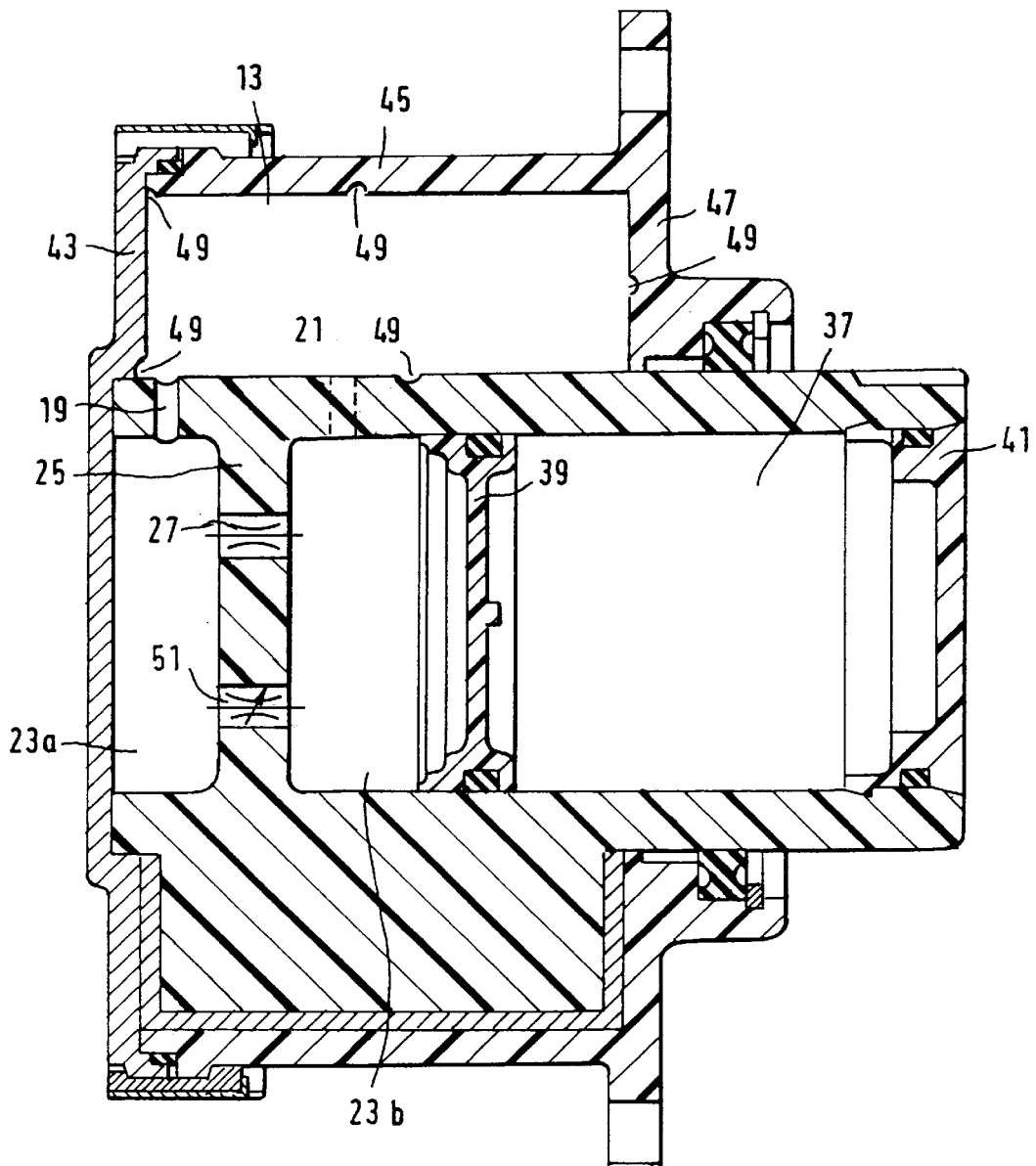
FIG. 2 shows a section through a rotary vibration damper with an adjustable damping valve.

Of course, as FIG. 2 shows, an adjustable damping valve 51 can be used instead of, or in combination with, the damping device 27. The damping valve 51 should allow damping medium to flow through it in alternating directions. In this regard, the contents of European reference EP 0 616 146, and German references DE 39 37 454, DE 41 09 471 and DE 42 39 160, for example, are incorporated herein by reference for teaching a damping valve that can be used in the present invention.

Figure 3:
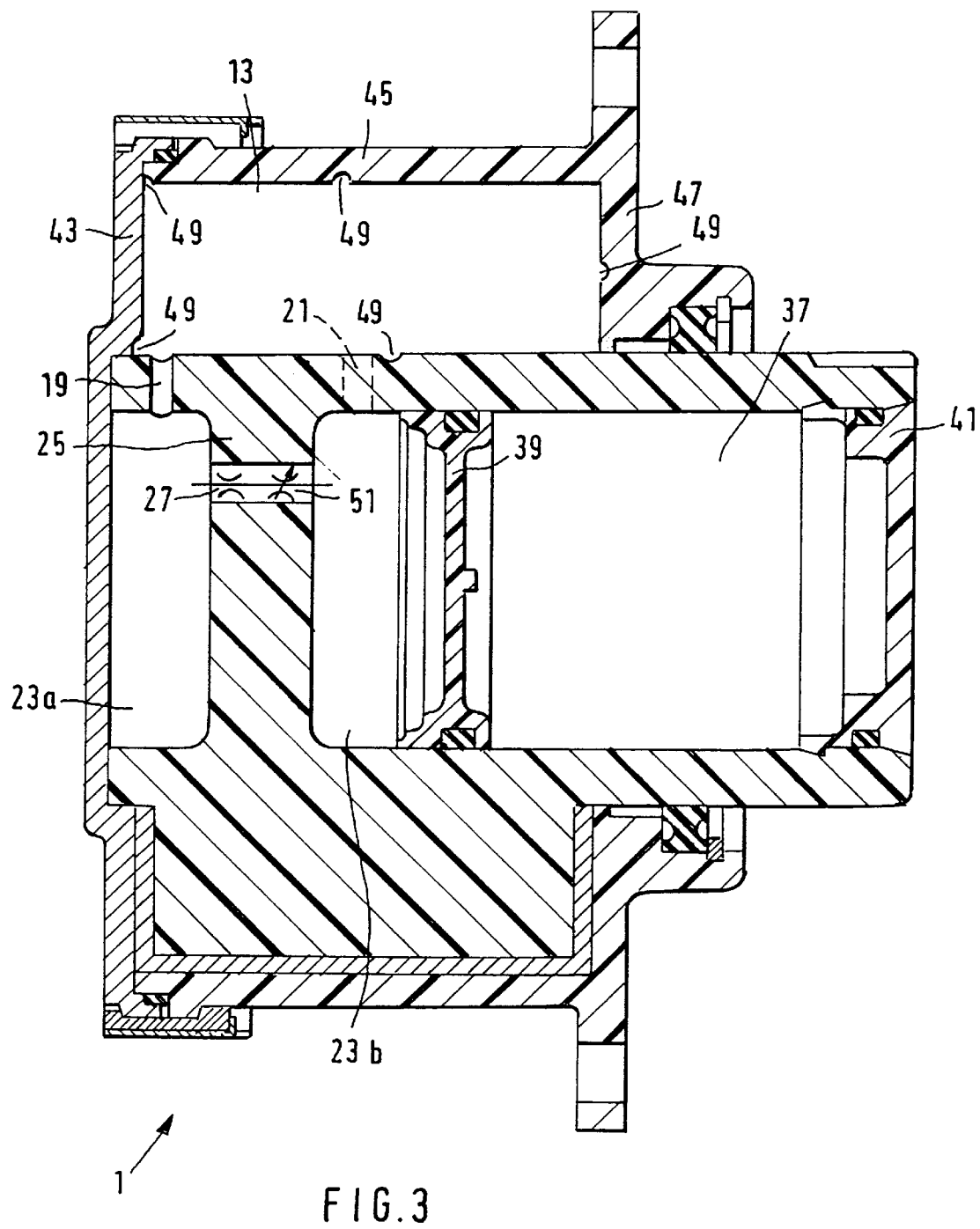
FIG. 3 is a view similar to FIG. 2, of another embodiment of the vibration damper.

FIG. 3 shows a modification of FIG. 2. In FIG. 3, the adjustable damping valve 51 is arranged in series relative to the damping device 27. In a parallel connection like that in FIG. 2, the maximum possible volume flow of the entire damping device is enlarged, building up on the damping device, by means of the adjustable damping valve 51. This results in an overall reduction in damping force, compared to a vibration damper without an adjustable damping valve. In a serial connection like that in FIG. 3, the damping level is elevated, compared to an embodiment without an adjustable damping valve 51, because the damping medium must flow through both valves. The two variants are to be seen as having equal value. A decision in favor of one variant or the other must always be made in conjunction with the desired damping characteristic.

Figure 4:
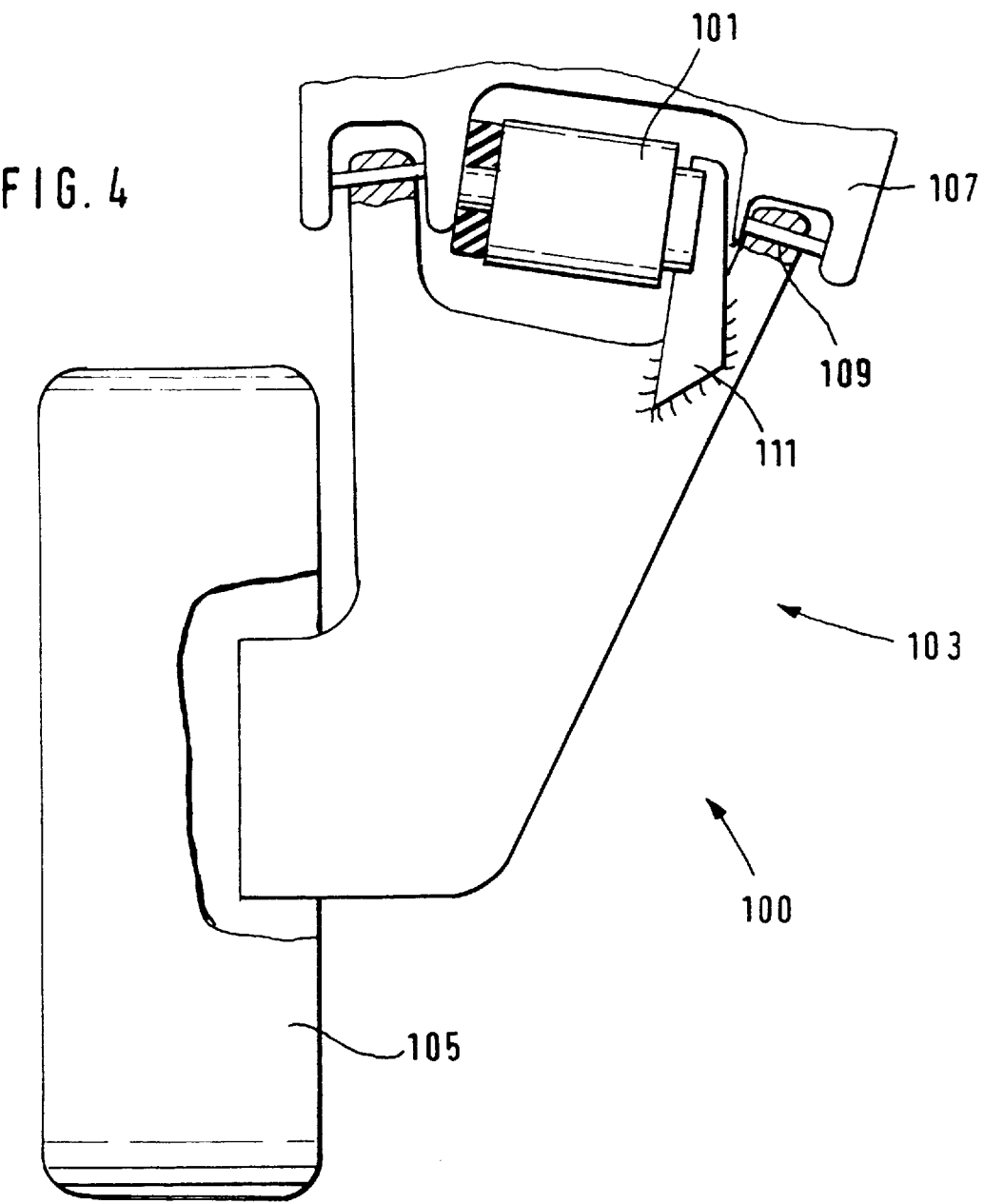
FIG. 4 is a top view of a vehicle axle with a rotary vibration damper.

A vehicle axle 100 with a rotary vibration damper 101 illustrates an application for the invention. The vehicle axle 100, seen in a top view in FIG. 4, has a semi-trailing arm as the control arm 103, which is connected to the vehicle wheel 105. The semi-trailing arm 103 is connected to a component, e.g., a subframe 107, arranged in stationary fashion relative to the vehicle body. A known rotary bearing 109, which here is shown only schematically, can be used as the linking member between the semi-trailing arm 103 and the subframe 107. The rotary vibration damper 101 lies in the pivot axle of the semi-trailing arm 103. As needed, the rotary bearing 109 can be embodied resiliently, to avoid strain. A transmitting lever 111 ensures the transmission of movement from the wheel 105 to the rotary vibration damper 101 via the semi-trailing arm 103.

Figure 5:
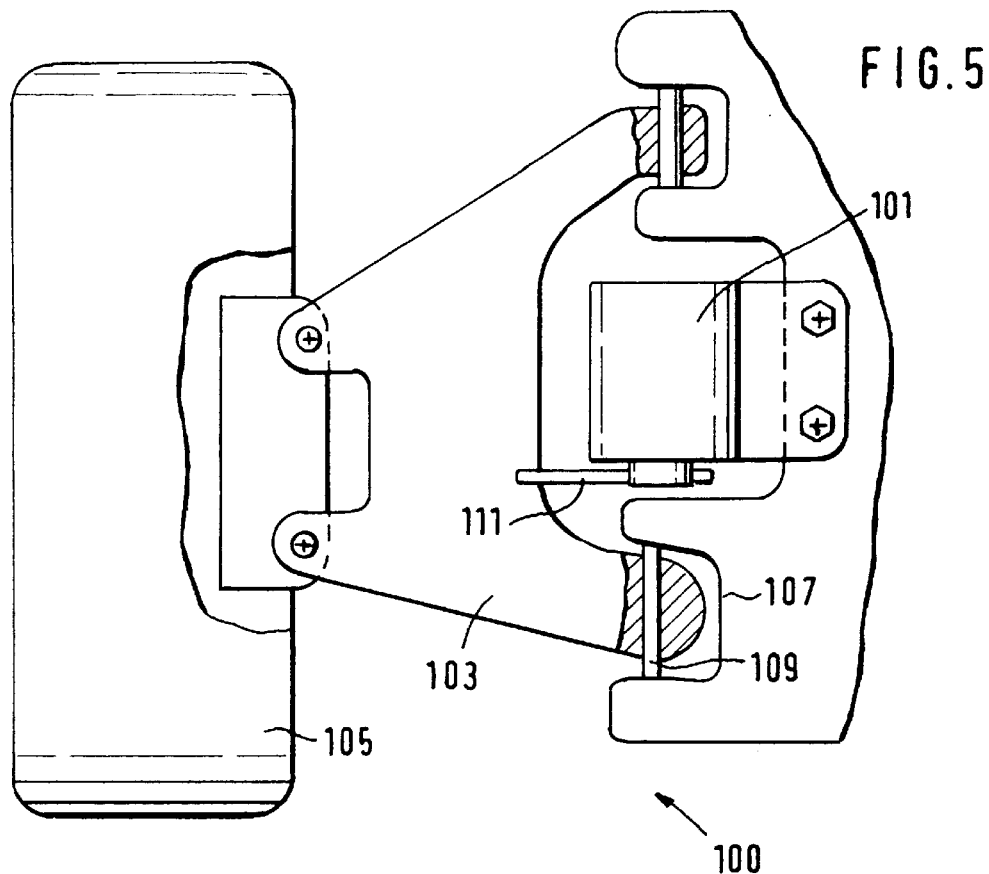
FIG. 5 is a view as in FIG. 4 of a transverse link axle incorporating the inventive damper.

FIG. 5 shows a schematic top view of vehicle axle 100 as a transverse link axle. The principle of the arrangement of the rotary vibration damper 101 here corresponds exactly to that in FIG. 4, as illustrated by the use of the same reference numbers for the same or similar parts. In this example, the rotary vibration axle of the rotary vibration damper again lies in the pivot axle of the vehicle axle.

Figure 6:
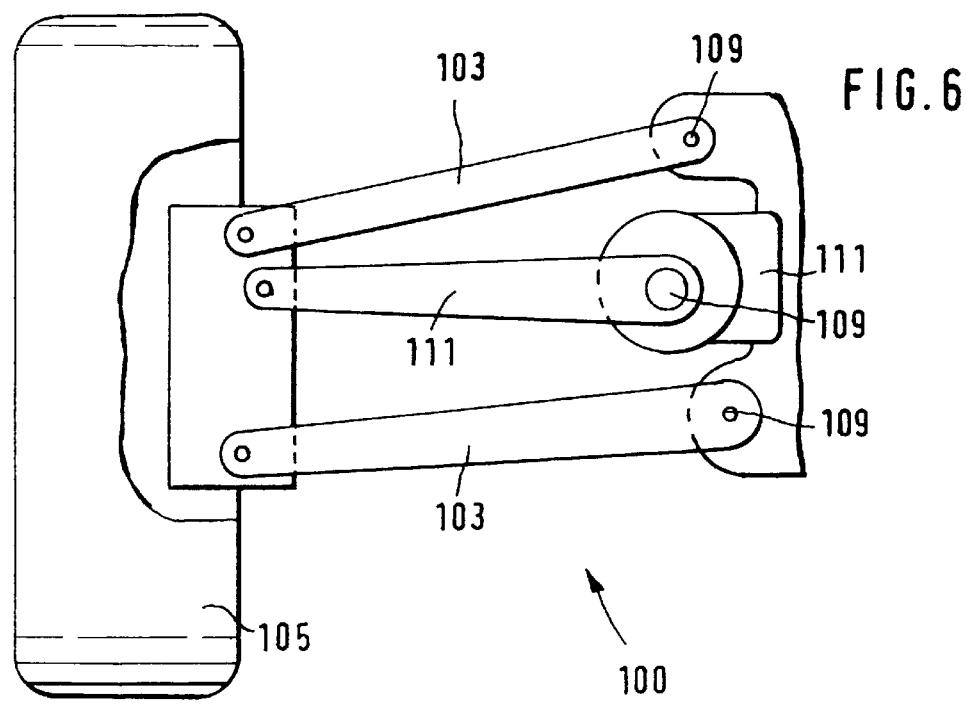
FIG. 6 is a front view of a double transverse link axle.

FIG. 6 is a front view of a double transverse link axle. In this embodiment, one of the rotary bearings 109 must be resiliently movable to compensate for overexcitation of the control of the vehicle wheel 105.

Figure 7:
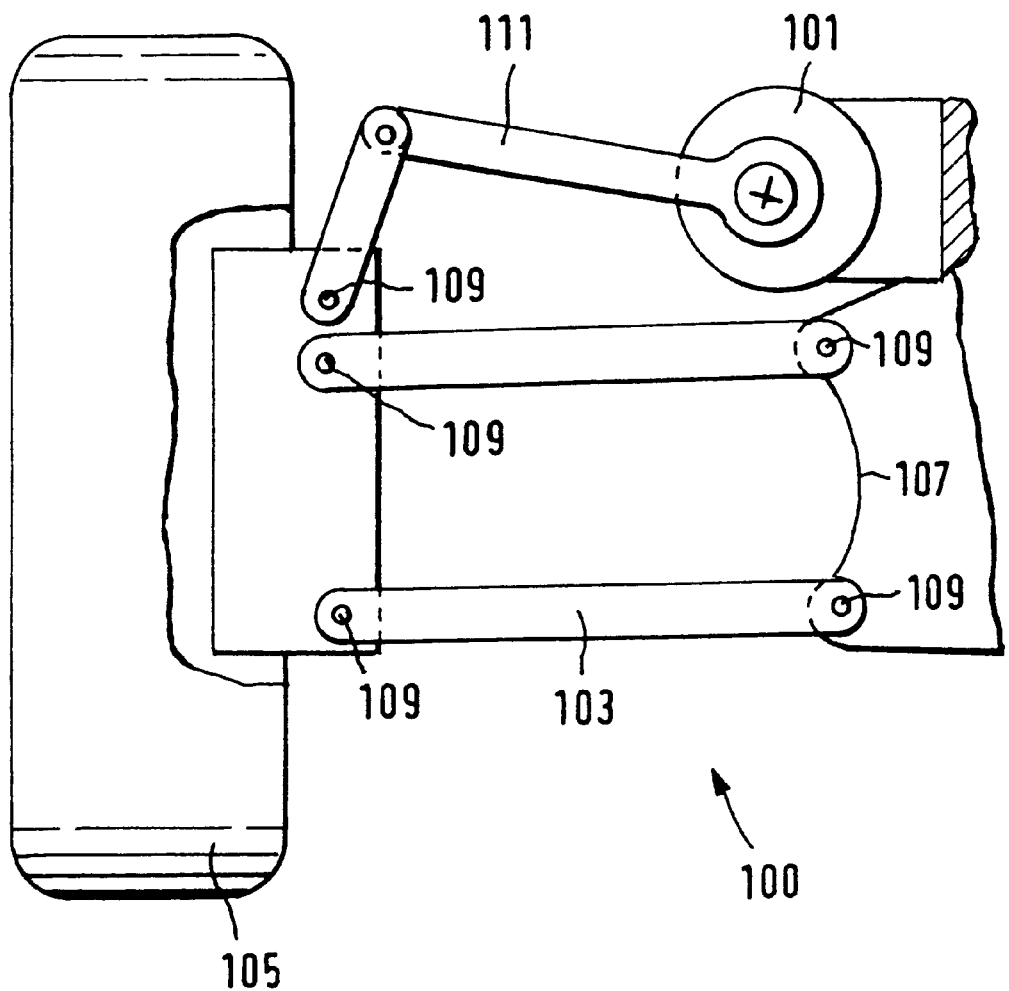
FIG. 7 is a front view similar to FIG. 6, showing a different configuration.

FIG. 7 shows a front view of the vehicle axle 100. The problem of overexcitation of the bearing of the control arms is solved, in that the transmitting lever 111 is embodied in two parts in angularly movable fashion, so that no longitudinal stresses can result from different curve paths of the pivot points of the rotary bearing 109.

Figure 8:
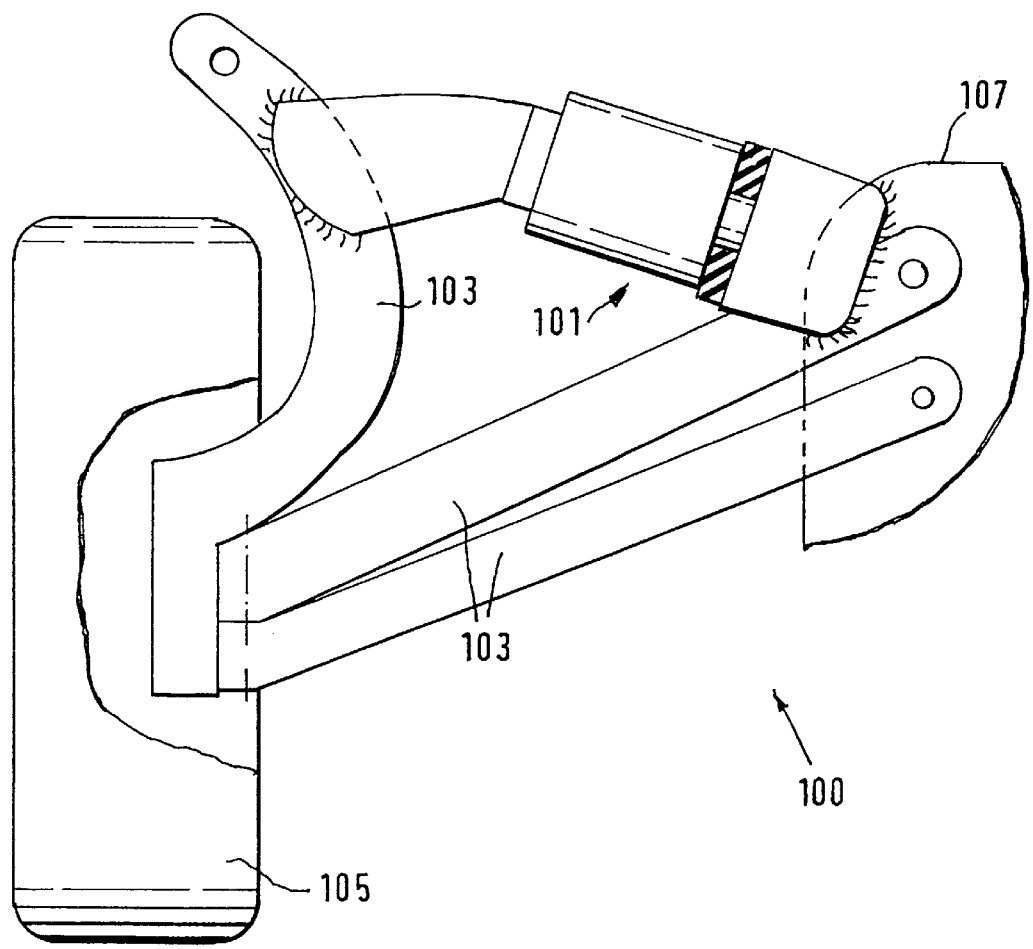
FIG. 8 is a front view as in FIG. 6 showing still another configuration.

As FIG. 8 shows, a rotary vibration damper 101 can also be used in the case of a vehicle axle 100 in the form of a spherical control arm axle.

The invention is not limited by the embodiments described above which are presented as examples only but can be modified in various ways within the scope of protection defined by the appended patent claims.

What is claimed is:

1. A passive rotary vibration damper, comprising:

a housing;

a stator having stator vanes;

a rotor having vanes and a rotational axis, the stator vanes and the rotor vanes being alternatingly arranged in the housing so as to form at least two work chambers fillable with damping medium, which work chambers alternately change their volumes during vibrational movement of the rotor relative to the stator;

at least one damping device connected to at least one of the work chambers and arranged centrally relative to the rotational axis of the rotor, the damping device being configured to have a collection space connected to each of the work chambers by the radial flow connections, the collection space being divided into two parts, each of the collection space parts being configured to connect all work chambers of one rotational direction;

a separating wall arranged to separate the collection space into the two parts, the damping device being arranged in the separating wall, the damping device having choke openings which are partially covered by valve plates; and at least one radial flow connection arranged to connect the work chamber to the damping device, the at least one radial flow connection being arranged outside of the rotor vanes and the stator vanes, the housing having a compensation chamber arranged centrally relative to the rotational axis for volume expansion of the damping medium that occurs during heating.

2. A rotary vibration damper as defined in claim 1, wherein the damping device is configured to have an adjustable damping force.

3. A rotary vibration damper as defined in claim 1, wherein at least one by-pass slot is arranged between two work chambers of different indexing so as to allow damping force to flow in a manner dependent on torsional angle and thus on stroke.

4. A rotary vibration damper as defined in claim 3, wherein a number of the bypass slots are provided so as to permit a symmetrical arrangement relative to the working chambers.

5. A rotary vibration damper as defined in claim 1, wherein the compensation chamber is arranged in series relative to the collection space.

6. A rotary vibration damper as defined in claim 5, and further comprising an axially movable separating piston arranged to separate the compensation chamber from the collection space.

7. A rotary vibration damper as defined in claim 6, wherein the damping device is configured to have a damping force that is settable so as to be greater for one rotary movement than for another rotary movement, under otherwise comparable conditions, so that the separate collection space parts have different pressure levels, whereby the compensation chamber is pressurized by a collection space part that has a lower pressure level.

8. A rotary vibration damper as defined in claim 5, wherein the housing has at least one part that is in contact with damping medium in the work chambers, the one housing part being made of a heat-conducting material.

* * * * *